(12) United States Patent
Chambliss et al.

(10) Patent No.: US 10,158,623 B2
(45) Date of Patent: Dec. 18, 2018

(54) DATA THEFT DETERRENCE

(71) Applicant: INTERNATIONAL BUSINESS MACHINES CORPORATION, Armonk, NY (US)

(72) Inventors: David Chambliss, Morgan Hill, CA (US); Rhonda L. Childress, Austin, TX (US); Itzhack Goldberg, Hadera (IL); Nir Mor, Kabri (IL); Cliff Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 14/870,625

(22) Filed: Sep. 30, 2015

(65) Prior Publication Data

US 2017/0093844 A1     Mar. 30, 2017

(51) Int. Cl.
*H04L 29/06*     (2006.01)
*G06F 21/10*     (2013.01)

(52) U.S. Cl.
CPC .......... *H04L 63/0823* (2013.01); *G06F 21/10* (2013.01); *H04L 65/1023* (2013.01)

(58) Field of Classification Search
CPC .. H04L 63/0823; H04L 65/1023; G06F 21/10
See application file for complete search history.

(56) References Cited

U.S. PATENT DOCUMENTS

| | | | |
|---|---|---|---|
| 7,263,497 B1 * | 8/2007 | Wiser | G06Q 20/3829 705/26.8 |
| 8,185,497 B2 | 5/2012 | Vermeulen et al. | |
| 8,719,586 B1 * | 5/2014 | Paleja | G06F 21/121 705/57 |
| 8,881,224 B2 | 11/2014 | Saxena et al. | |
| 8,984,478 B2 | 3/2015 | Epstein | |
| 9,332,290 B2 * | 5/2016 | Amidei | H04N 21/25825 |
| 2002/0013772 A1 * | 1/2002 | Peinado | G06F 21/10 705/51 |
| 2002/0108050 A1 * | 8/2002 | Raley | G06F 21/10 713/193 |
| 2002/0184508 A1 * | 12/2002 | Bialick | G06F 21/10 713/182 |

(Continued)

*Primary Examiner* — Robert B Leung
*Assistant Examiner* — Thomas Ho
(74) *Attorney, Agent, or Firm* — Schmeiser, Olsen & Watts, LLP; Daniel E. Johnson

(57) ABSTRACT

A method and system for regulating access by an access program to a data object residing in a storage system, which may be used to protect against data theft in a storage server. The storage server receives, from a client node, a certificate request for a certificate pertaining to access of the data object by the access program. The storage server validates the certificate request and in response, generates the certificate and transmits the certificate to the client node. The certificate request and the certificate each include a signature of the access program and an identifier of the data object. The storage server receives from the client node an I/O request for access of the data object by the access program. The storage server determines whether the I/O request is valid or invalid and processes the I/O request with privileged handling or degraded handling, respectively.

12 Claims, 8 Drawing Sheets

(56) References Cited

U.S. PATENT DOCUMENTS

| | | | |
|---|---|---|---|
| 2003/0014635 A1* | 1/2003 | Laforge | G06Q 30/04 |
| | | | 713/176 |
| 2003/0028664 A1* | 2/2003 | Tan | G06F 21/10 |
| | | | 709/237 |
| 2003/0101190 A1 | 5/2003 | Horvitz et al. | |
| 2003/0191944 A1* | 10/2003 | Rothrock | G06F 21/10 |
| | | | 713/182 |
| 2006/0033645 A1* | 2/2006 | Kalker | H04N 21/234327 |
| | | | 341/50 |
| 2007/0219917 A1* | 9/2007 | Liu | G06F 21/10 |
| | | | 705/59 |
| 2008/0276000 A1* | 11/2008 | Motte | H04L 12/14 |
| | | | 709/233 |
| 2009/0183001 A1* | 7/2009 | Lu | G06F 21/10 |
| | | | 713/168 |
| 2010/0228862 A1* | 9/2010 | Myers | H04L 65/105 |
| | | | 709/227 |
| 2012/0108200 A1* | 5/2012 | Rubin | H04L 47/14 |
| | | | 455/405 |
| 2013/0124853 A1* | 5/2013 | Sorotokin | G06F 21/6209 |
| | | | 713/153 |
| 2013/0166909 A1* | 6/2013 | Agrawal | H04L 63/123 |
| | | | 713/168 |
| 2013/0269039 A1 | 10/2013 | Gold et al. | |
| 2014/0331337 A1 | 11/2014 | Factor et al. | |

* cited by examiner

DATA THEFT DETERRENCE

TECHNICAL FIELD

The present invention relates generally to access control of data, and more particularly to regulation of access by an access program to a data object residing in a storage system.

BACKGROUND

Theft of data is a problem that has long existed in data processing environments and continues to be a problem currently. Control of access to data has been an approach attempting to mitigate theft of data.

There are existing closed-system security approaches for controlling access of data that allow access of data only through a fixed list of proprietary software, but the existing closed-system security approaches do not offer sufficient configurability.

Systems of the existing art often allow access through applications which an administrator may want disabled for security reasons, but do not provide high-performance access for applications from a different vendor which the administrator would want to certify for high performance.

Another kind of access limitation in the existing art is the disabling of some communication mechanisms (e.g., USB ports) to discourage abuse.

SUMMARY

The present invention provides a method, and associated computer system, for regulating access by an access program to a data object residing in a storage system. A storage server receives, from a client node, a certificate request for a certificate pertaining to access of the data object by the access program. The storage system comprises the storage server and the data object. The client node comprises the access program. The certificate request comprises a signature of the access program and an identifier of the data object. The storage server validates the certificate request and in response, generates the certificate and transmits the certificate to the client node. The certificate comprises the signature of the access program, the identifier of the data object, and a certificate authentication code for validating the certificate. After the transmitting of the certificate, the storage server receives, from the client node, an input/output (I/O) request for access of the data object by the access program. The storage server determines whether the I/O request is valid or invalid and processes the I/O request with privileged handling or degraded handling, respectively.

DETAILED DESCRIPTION

The present invention enables a data storage system to recognize privileged access to data by certified access programs, and offers only degraded access to data by non-certified programs.

The certification of access programs for unrestricted access is performed as part of system configuration. When an installed program is certified for privileged access to a given data object, that fact is embodied in persistent metadata in the storage system, or persistent metadata managed by the application/middleware server, or both. The certification action is a process of establishing a shared secret between the storage system and the configuration data associated with the access program, which secret is referenced at input/output (I/O) time to populate and validate authentication fields in the I/O commands.

The present invention is advantageous over prior art that controls access entirely on the authorization of the person/account performing the access, because such prior art does not offer protection against insiders who must have access to data and are not specifically identified as untrustworthy. The present invention enables parties to perform legitimate access without restriction and no loss of efficiency, but introduces impediments when such parties attempt access mechanisms outside of legitimate needs. Those impediments make it difficult or impossible for the insider attackers to steal large volumes of data in a limited time.

In this manner, even an authorized user who can access a given type of data could not access the data through the tool of the user's choice but just through certified programs; otherwise the access will be denied or degraded (e.g., rate-limited). This new protocol between the storage and the operating system/applications layers makes it more difficult for a malicious user to have a wholesale copy of sensitive data. For example, an improperly authorized user might be able to copy a few sensitive records in a tedious manual fashion, but would not be allowed to transmit an entire database or files to the user's USB stick.

Figure 1:
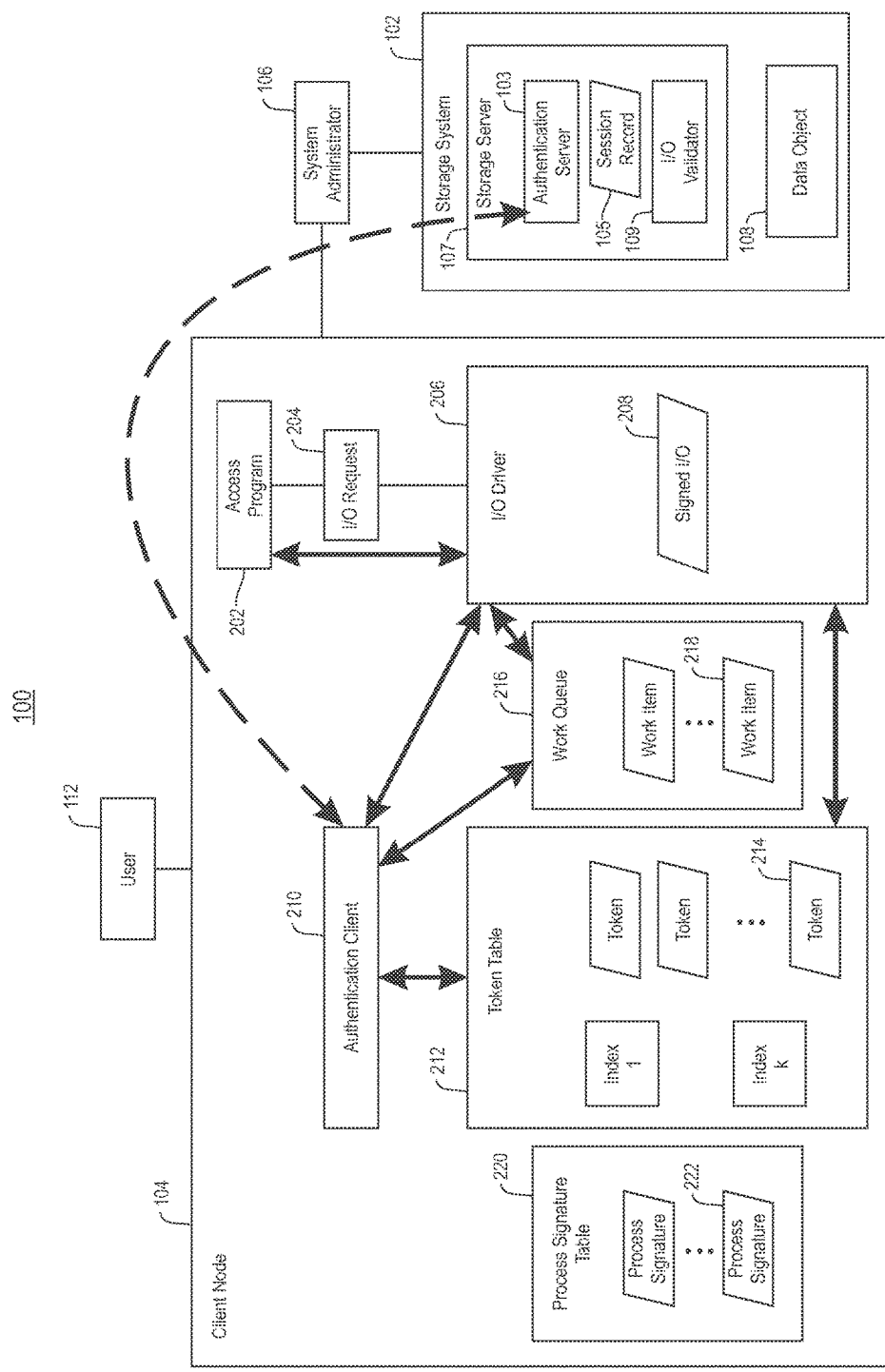
FIG. 1 is a diagram of a system, in accordance with embodiments of the present invention.

FIG. 1 is a diagram of a system 100, in accordance with embodiments of the present invention. The system 100 of FIG. 1 comprises a client node 104, a user 112 who may interact with the client node 104, a storage system 102, and a system administrator 106 coupled to the storage system 102.

The storage system 102 comprises a storage server 107, a data object 108 managed by the storage system 102 and stored in a computer readable storage device or data store (e.g., a database system). The storage server 107 comprises an authentication server 103, a session record 105, and an I/O validator 109.

The storage server 107 is distributed across one or more hardware servers.

The client node 104 comprises an access program 202 generating an input/output (I/O) request 204, an I/O driver 206 receiving the I/O request 204 and generating a signed I/O request 208 or a native I/O request, an authentication client 210, a token table 212 comprising tokens 214, a work queue 216 comprising work items 218, and a process signature table 220 comprising process signatures 222.

The client node 104 comprises a computer, a workstation, or the like.

The access program 202 may be a user-visible application or other software used on the application host as middleware or a service, including, for example, database management software, file system software, or daemons such as File Transfer Protocol Daemon (FTPD).

The authentication client 210 is able to communicate with the authentication server 103. The means of such communication between the authentication client 210 and the authentication server 103 can be in-band or out-of-band with respect to the communications channel used to submit I/O requests; the means of such communication may include an authenticated and/or encrypted channel.

In one embodiment, the system 100 may reside in a Linux® system, building on some features of the Linux® Integrity Subsystem. In this embodiment, the data objects with managed access may comprise Small Computer System Interface (SCSI) logical units.

Figure 2:
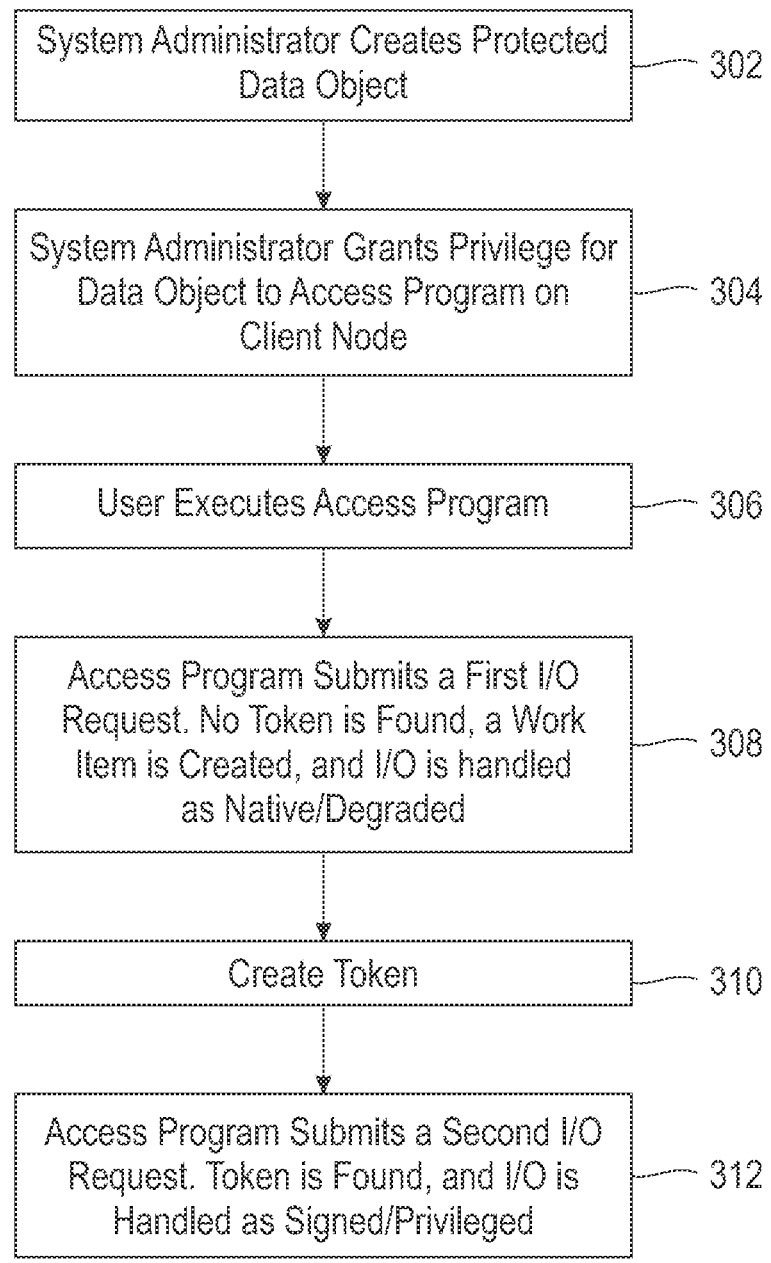
FIG. 2 is a flow chart describing a method for regulating access by an access program to a data object residing in a storage system, in accordance with embodiments of the present invention.

FIG. 2 is a flow chart describing a method for regulating access by the access program 202 to the data object 108 residing in the storage system 102, in accordance with embodiments of the present invention. The method described in FIG. 2 may be used to protect against data theft in the storage server 107.

In step 302, the system administrator 106 creates data objects (SCSI logical units; e.g., data object 108) and marks the created data objects as protected, which creates a record on the storage server 107 of the protected status of the created data objects.

To implement step 302, the system administrator 106 may access the administration service associated with the storage server 107, and present a password or other credentials to establish authenticity as an administrator. In addition, the system administrator 106 may have the object marked as protected. The storage server 107 may record the marking of the object as protected to inform future processing. In addition, the storage system 102 may be configured (e.g., by the system administrator 106) to associate metadata of the access program 202 with privileged access to the data object 108.

In step 304, the system administrator 106 addresses the client node 104 and designates the data object 108 on the client node 104 for privileged access to the data object 108. The authentication client 210 on the client node 104 records, on the client node 104, a certificate that is a digital passport that can later be used for the access program 202 to obtain privileged access to the data object 108. In one embodiment, the certificate may be a file recorded on the file system of the client node 104. The operation, of designating one or more access programs on the client node 104 for privileged access to the data object 108, includes steps of communication with the storage server 107 and authentication that the system administrator 106 has a right to create such a certificate. Step 304 is described in more detail in FIG. 3.

In step 306, the user 112 executes the access program 202 on the client node 104, which creates one or more processes (e.g., one or more Linux® processes). A record in memory is kept of what executable is running in each process. When the operating system is invoked to perform an exec( ) or equivalent operation, which uses the file form of an access program and launches execution of the access program, the digital signature of the code being launched is computed and recorded via, in one embodiment, using the provisions of the Integrity Measurement Architecture of the Linux® Integrity Subsystem. Step 306 is described in more detail in FIG. 4.

In step 308, the access program 202 running in a process issues a first I/O request against the protected data object 108. The I/O driver 206 looks for a valid token in the token table 212 for the process running the access program 202 which grants access to the data object 108. No valid token is found in the token table 212 for the process running the access program 202. The I/O driver 206 posts a work item 218 that requests the authentication client 210 to create a token 214 to use in future I/Os, and the I/O driver 206 processes the present I/O request in the native form which is handled with degraded handling. An I/O request 204 in the native form is an I/O request that does not contain valid signature fields of the kind present in a signed I/O request 208. The structure of an I/O request 204 in the native form may be similar to or identical to I/O requests in the existing art, such as for example READ10 and WRITE10 SCSI commands. Alternatively, an I/O request 204 in the native form may have the same structure as a signed I/O request 208 but contain values that are recognized as meaning that the signature fields contained therein are not valid. Step 308 is described in more detail in FIG. 5.

In step 310, upon receiving the posted work item 218 which is a request for creation of a token, the authentication client 310 communicates with the storage server 106 to create a token 214, and record the token 214 in the token table 212 on the client node 104. The token 214 is a data object in memory that represents a session for using the data object 108. For each token on any client node, a corresponding session record 105 will generally be created on the storage server 107. The token 214 can be used to issue signed I/O requests 208 that obtain privileged handling. Step 308 is described in more detail in FIG. 6.

In step 312, the access program 202 running in a process issues a second I/O request against the protected data object 108. The I/O driver 206 looks for a valid token in the token table 212 for the process running the access program 202 which grants access to the data object 108. A valid token 214 is found in the token table 212 for the process running the access program 202. The found valid token 214 is used by the I/O driver to create a signed I/O request 208 which is issued to the storage server 106. A signed I/O request 208 is an I/O request that contains signature fields that are recognized by the storage server 106 as evidence of a valid certificate on the client node. The signed I/O request 208 is recognized and handled with privileged handling. Step 312 is described in more detail in FIG. 5.

Figure 3:
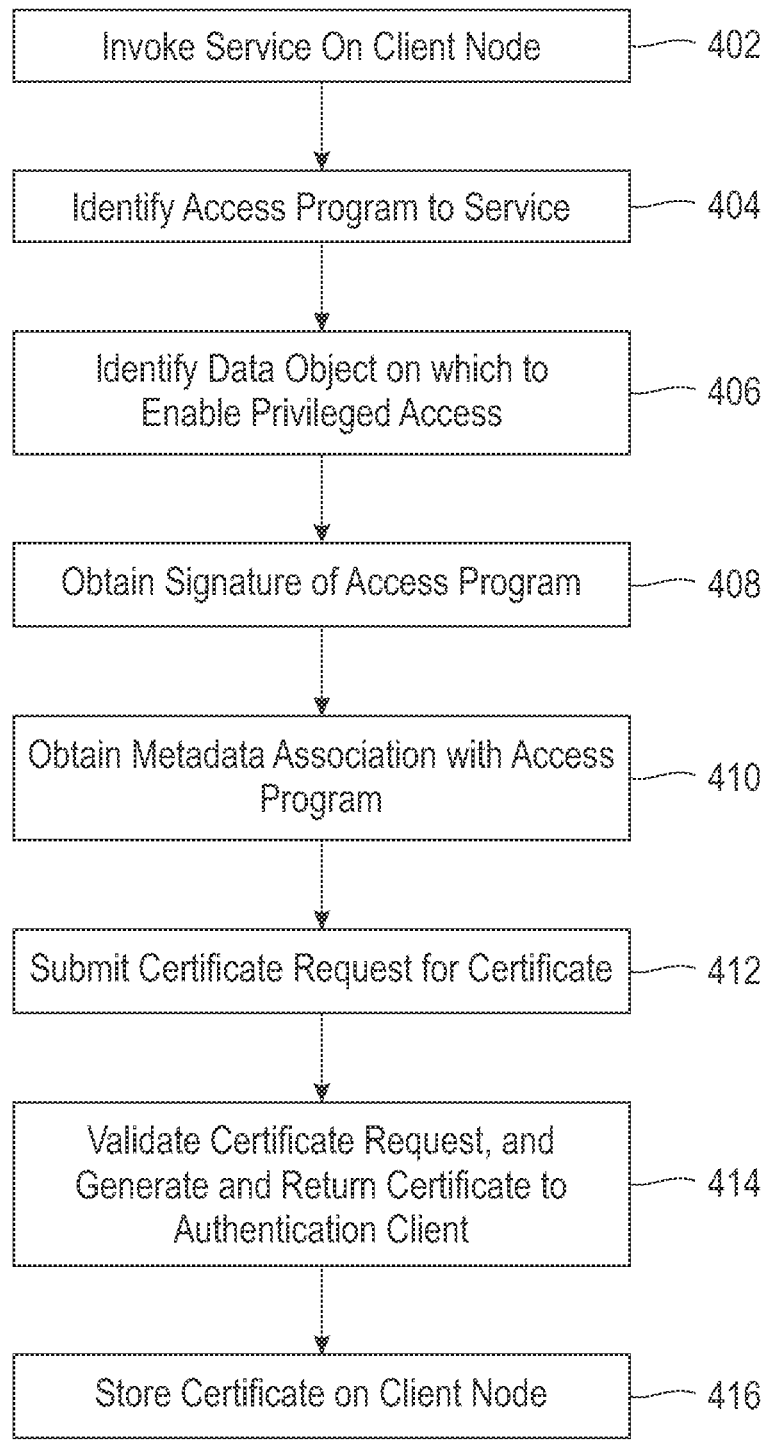
FIG. 3 describes in more detail a step of FIG. 1 for generating and storing a certificate to enable privileged access to the data object, in accordance with embodiments of the present invention.

FIG. 3 is a flow chart describing in more detail the step 304 of FIG. 1 for generating and storing a certificate to enable privileged access to the data object 108, in accordance with embodiments of the present invention.

In step 402, the system administrator 106 invokes a service on the client node 104 that includes the authentication client 210.

In step 404, the system administrator 106 identifies to the service the particular executable (i.e., the access program 202) to be enabled with privileged access, for example by selecting the access program 202 from a list of eligible executables.

In step 406, the system administrator 106 identifies the data object 108 on which to enable privileged access, for example by selecting data object 108 from a list of data objects obtained from the storage server 107.

In step 408, the authentication client 210 obtains from the operating system on the client node 104 the signature of the access program 202. That signature is a number computed from the binary contents of the access program 202. That signature is computed, in one embodiment, in the same way as is done in the Integrity Measurement Architecture on application launch.

In step 410, in one embodiment, the authentication client 210 obtains metadata associated with the access program 202 controlling the means of execution of the executable, and computes a signature of the metadata.

In step 410, the system administrator 106 may supply to the authentication client 210 inputs that identify the applicable metadata and may include the names of environment variables, paths to metadata directories, and a pattern for the command-line invocation for the executable of the access program 202. The authentication client 210 uses the inputs to determine a list of directories whose contents are to be included in the validated metadata. The authentication client 210 stores the inputs, the values of the environment variables listed in the inputs, and the list of directories as a metadata validation record. The signature of the metadata is computed from a concatenation of the metadata validation record with the contents of all the directories listed in it.

In step 412, the authentication client 210 submits a certificate request, for a certificate, to the authentication server 103 contained on the storage server 107. The certificate request contains identification fields comprising at least the signature of the access program 202, the signature of metadata of the access program 202 if such metadata is used, and the identifying world-wide-name of the data object 108. The certificate request may also contain identification fields of the client node 104 and of the authentication client 210 that issues the certificate request.

In step 414, the authentication server 103 validates the certificate request and generates a certificate and transmits the certificate to the authentication client 210. Validation of the certificate request includes determining that the request was received from a trusted requestor with permission to make such a request. The certificate comprises the identifying data from the certificate request (which includes at least the signature of the access program 202, metadata of the access program 202 and/or the signature of metadata of the access program 202 if such metadata is used, and the identifying of the data object 108 as stated supra) and a certificate authentication code that is used in the future to validate the certificate. The certificate authentication code may comprise a secure checksum of the identifying data concatenated with a private value known to the authentication server 103. The certificate may also comprise bookkeeping information such as an expiration timestamp.

In step 416, the authentication client 210 stores the certificate on the client node 104. For example, the authentication client 210 may store the certificate in a file system or in a database (e.g., in a well-known location relative to the access program 202). If in step 410 a metadata validation record was stored, then the certificate is stored in association with the metadata validation record.

If the certificate includes metadata of the access program 202 and/or the signature of metadata of the access program 202, the act of certification creates a binding between the identifying metadata of the access program 202 and the identifying information of the data object 108.

The scope of certification may vary according to different embodiments and according to choices made in configuring restrictions on the data object 108. That is, the unit subject to certifying as an access program may be a particular installation in a particular place, or a version of an access program installation image regardless of where installed, or a family of related installation images bound to a particular host, or a family of related images regardless of where installed. These possibilities differ in the implementation mechanisms, in the ease of management the implementation mechanisms offer, and in the degree of protection the implementation mechanisms create.

Figure 4:
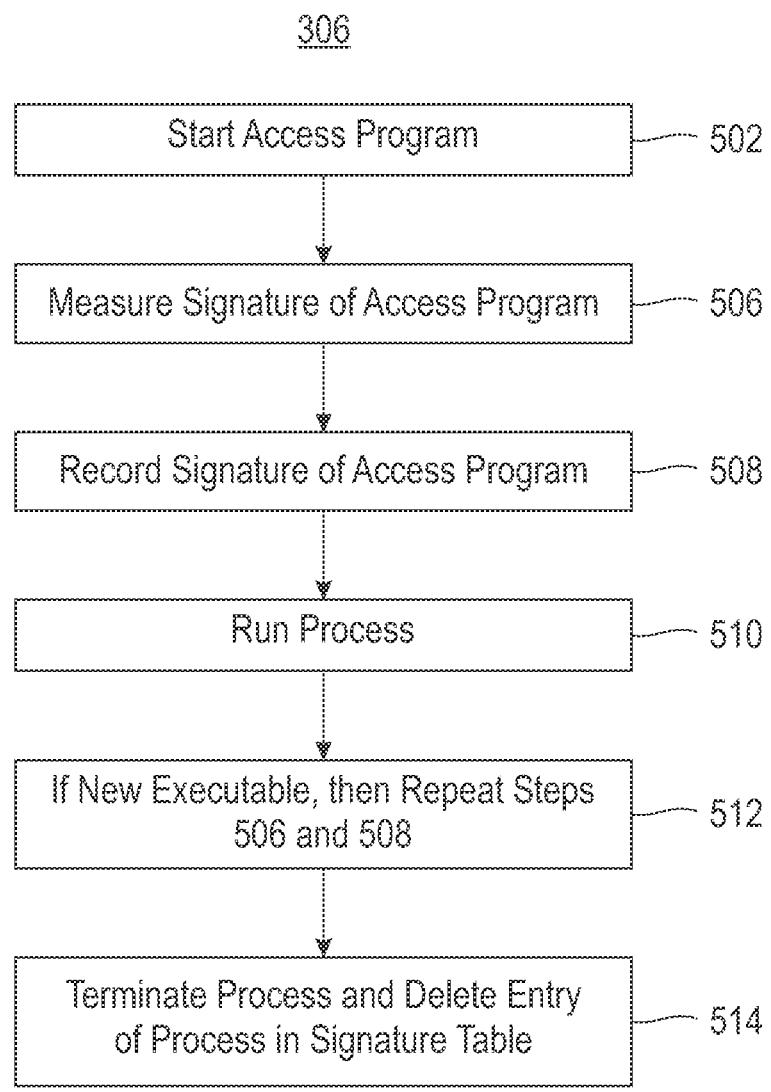
FIG. 4 describes in more detail a step of FIG. 1 for executing the access program which creates a process, in accordance with embodiments of the present invention.

FIG. 4 is a flow chart describing in more detail the step 306 of FIG. 1 for executing the access program 202 which creates a process, in accordance with embodiments of the present invention.

In step 502, the user starts the access program 202, which causes the access program to be invoked through the use of an operating system call.

In step 506, the operating system in the client node 104, in servicing the call, measures the signature of the access program 202.

In one embodiment, measuring the signature of the access program 202 comprises calculating a numerical function across contents of the executable access program 202, regarding the contents as binary data, yielding as output a data value which is the signature. The numerical function is selected such that it is exceedingly unlikely to obtain the same signature value for two executable programs whose contents are not identical. Such functions are familiar in the art for use in computing secure hashes, secure checksums, and message authentication codes, and include those functions named MD5 and SHA-1.

In step 508, the operating system in the client node 104 records the signature of the access program 202 in the process signature table 220 in association with the process identifier of the process executing the access program 202.

In step 510, the process then runs.

In step 512, if the process invokes a new executable, as through an exec( ) call, then the operating system in the client node 104 repeats steps 506 and 508, updating the process signature table 220.

In step 514, the process terminates and the entry of the process in the signature table is deleted.

Figure 5:
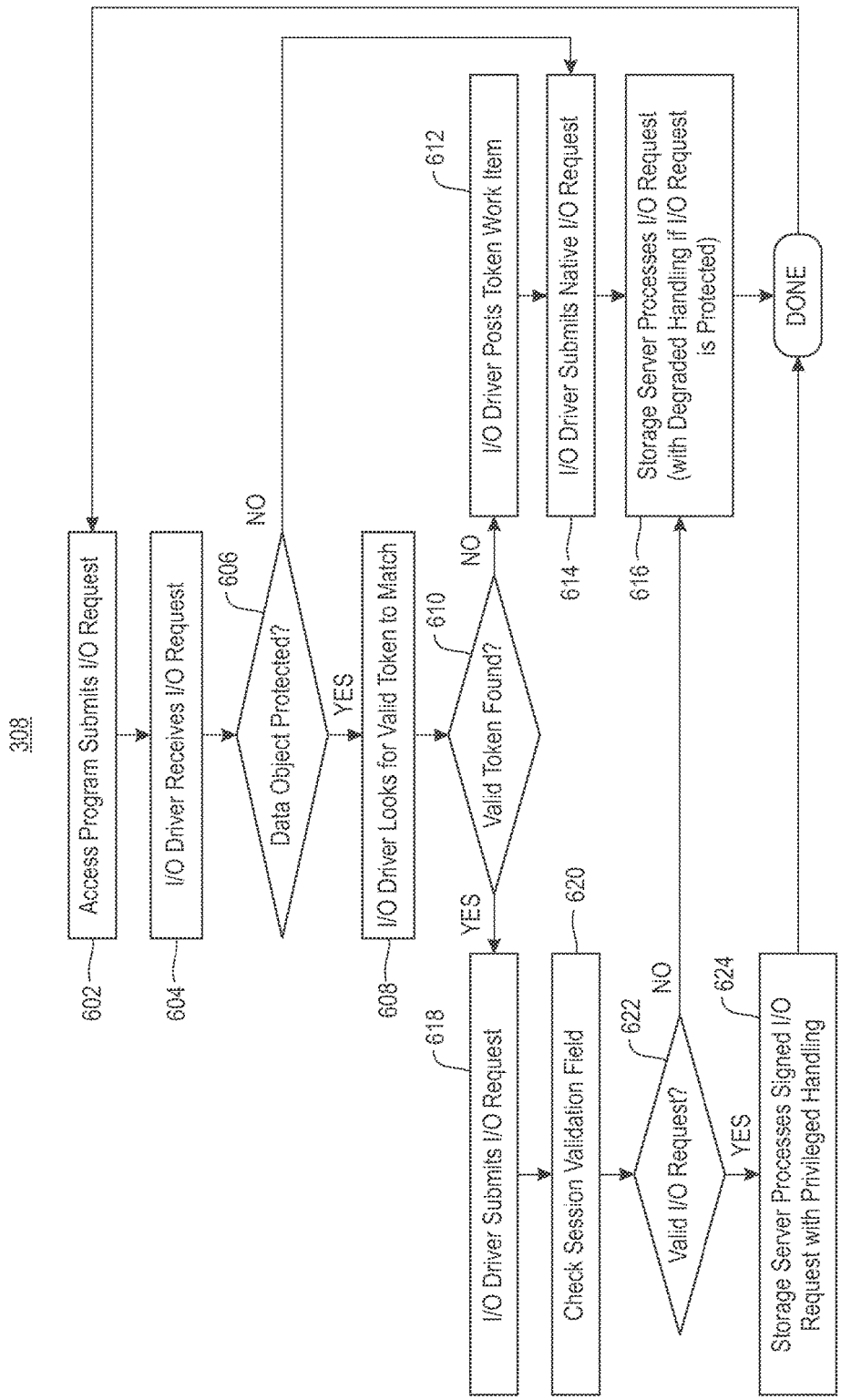
FIG. 5 is a flow chart describing in more detail steps of FIG. 1 for searching for a token in response to an I/O request for the data object, in accordance with embodiments of the present invention.

FIG. 5 is a flow chart describing in more detail the steps 308 and 312 of FIG. 1 for searching for a token in response to the I/O request 204 for the data object 108, in accordance with embodiments of the present invention.

In step 602, the access program 202 running in a process issues an I/O request against the data object 108.

In step 604, the I/O driver 206 receives the I/O request issued by the access program 202.

In step 606, the I/O driver 206 determines whether the data object 108 is protected, by examining the control block data structures containing data populated when the client node 104 established its connection to the storage server 107 and to the logical units on the storage server 107.

If the I/O driver 206 determines that the data object 108 is not protected (NO branch from step 606), then there is no need to look for a token, and the I/O request 204 is fulfilled (step 614) using a native I/O request submitted by the I/O driver 206.

If the I/O driver 206 determines that the data object 108 is protected (YES branch from step 606), then the I/O driver searches (step 608) in the tokens table 212 for a valid token. The search is based on the process ID generating the request and the identifiers of the data object 108. There may be index structures (index 1, . . . , index k) set up so that the lookup is faster. If a token is found in the tokens table 212, the found token is validated by comparing the executable signature in the token with the executable signature associated with the process of the access program 202. If the preceding two tokens do not match, then the found token is invalid. The token may also have a limited span of validity. For example the span may limit the token to a number of I/Os or a definite lifetime and if the span is exhausted then the token is invalid. The span may comprise a list of code values such that each code value is usable only once and when all of the code values are used the token is invalid. If the token is invalid, then the token is removed from the tokens table 212.

In step 610, the I/O driver 206 determines whether the I/O driver 206 has a valid token.

If step 610 determines that the I/O driver 206 has no valid token (NO branch from step 610), then the I/O driver 206 posts (step 612) a work item to request a token. The work item includes the process ID, the current executable signature, and the identifiers of the data object 108. Then in step 614, the I/O driver 206 submits a native I/O request or command. For example, the native I/O request may be a READ-10 or READ-12 or READ-16 SCSI command containing a logical block address, a block count, and identifiers of the logical unit. The storage server 107 processes (step 616) the native request with degraded handling if the data object 108 is protected. After step 616, the process resumes executing and may submit another I/O request in step 602. In one embodiment, an I/O request or command is serviced, in step 616, with degraded access to the data object 108 after a signature in the I/O request or command is found not to match metadata of the access program 202 configured for privileged access to the data object 108.

If step 610 determines that the I/O driver 206 has a valid token (YES branch from step 610), then in step 618 the I/O driver 206 constructs an I/O request, which must be signed in order to be valid, which is sent by the client node 104 to the storage server 107. The I/O request contains the fields that would be contained in a native I/O request, as well as signature fields which are data values that are recognized by the storage server 107 as evidence of a valid certificate on the client node 104. In this embodiment using a token, the signature fields comprise a session validation field derived from the valid token. The session validation field is recognized by the storage server 107 as evidence of a valid token on the client node 104, and the presence of the token is recognized as evidence of a valid certificate. The session validation field may comprise a session identifier taken from the token, a code value drawn from a list contained in the token, and a code index indicating which element in the list is used. Alternatively, the session validation field may comprise a session identifier taken from the token and a code value drawn from a list contained in the token using as an index a value computed from the I/O request fields.

When or after the I/O request is received by the storage server 107, the storage server 107, in step 620, determines whether the session validation field in the I/O request matches a valid session on the storage server 107. The storage server 107 may find the session record 105 identified by the session identifier, find the code list in the session record 105, locate the code value selected by the I/O request as either the code index contained in the session validation field or by the index computed from the I/O request fields, and test that the code value matches the code value in the session validation field. The storage server 107 may also test that the code value has not been used previously.

In step 622, the storage server 107 determines if the validation was successful.

If the storage server 107 determines that the validation was not successful (NO branch from step 622), then the storage server 107 processes (step 616) the request as if the request were a native request, with degraded handling. In one embodiment, the storage server 107 determines that the I/O request is not signed and thus invalid.

If the storage server 107 determines that the validation was successful (YES branch from step 622), then the storage server 107 processes (step 624) the signed I/O request with privileged handling.

Thus, when processing an I/O request against the protected data object 108, the storage server 107 provides the I/O request with privileged handling if the request is a signed I/O request that has been validated, and with degraded handling otherwise. Privileged handling is normal high-performance handling. In one embodiment, an I/O request or command is serviced, in step 624, with privileged access to the data object 108 after a signature in the I/O request or command is found to match metadata of the access program 202 configured for privileged access to the data object 108.

Some forms of degraded handling constitute moderately degraded handling and other forms of degraded handling constitute severely degraded handling.

When I/O requests are provided with moderately degraded handling the access programs issuing the I/O requests are expected to complete successfully and with correct results and degraded performance. Examples of moderately degraded handling include rate limitation and volume limitation.

Rate limitation is defined to require that the number of operations per second or the number of bytes per second does not exceed an imposed limit. The limit may be fixed or may be progressively reduced over time as degraded operations are continued.

Volume limitation is defined to require that the number of bytes does not exceed an imposed limit. The limit may be fixed or may be progressively reduced over time as degraded operations are continued.

When I/O requests are provided with severely degraded handling the access programs issuing the I/O requests are expected either to fail or to complete with incorrect results. Examples of severely degraded handling include I/O rejection, silent I/O rejection, device locking, and delivery of false data.

I/O rejection is defined to require that an error is reported as if the I/O server has encountered a problem preventing execution.

Silent I/O rejection is defined to require that the I/O is not performed but no report of error is returned to the client node.

Device locking is defined to require setting the data object, or some entity whose scope contains the data object, into a state for which no access to data content is possible for a time. The time might be a definite time or the time might be an indefinite time lasting until an unlocking action is performed.

Delivery of false data is defined to require that operations are allowed to complete with apparent success but with data different from the actual data being requested. The delivery of false data may fool the data thief into believing that the theft is progressing successfully when what is actually delivered does not have value and the loss of it will not cause harm to the legitimate owner. Delivery of false data may make it easier to catch and punish an attempted thief who might abandon the attempt when faced with immediate failure. Delivery of false data might also avoid prompting the thief from progressing to more difficult but potentially more effective attacks. The false data might simply be randomized bits, or might be engineered to resemble valid data.

The form of degraded handling used for a particular I/O request may be determined with reference to a policy chosen by the system administrator 106, and the policy may be different for different data objects.

In an embodiment, an available policy for degraded handling includes an escalation policy that executes an escalation from moderately degraded handling to severely degraded handling. The purpose of the escalation policy is to provide graceful handling when the system administrator 106 has not anticipated all valid use of the protected data object 108, and a user is making normal low-volume use of the data object using an access program that has not been certified for privileged handling, but to provide defense in the event that the user attempts high-volume data theft.

When the storage server 107 receives a non-privileged I/O request, the storage server 107 determines whether an applicable degraded I/O quota record is present.

If the storage server 107 determines that an applicable degraded I/O quota record is not present, the storage server 107 creates a new degraded I/O quota record containing a degraded handling transition threshold (DHTT) determined from policy and containing identifiers that specify to which I/O requests the quota record applies. The identifiers may comprise the identifier of the data object 108 and the identifier of the client node 104, meaning the quota record applies to I/O requests to the data object 108 from the client node 104. Alternatively, the identifiers may comprise only the identifier of the client node 104, meaning the quota record applies to I/O requests from the client node 104 to any data object. Having created a new quota record or having determined that an applicable quota record is already present, the storage server registers the non-privileged I/O request against the DHTT, and determines whether the DHTT has been exceeded.

In an embodiment, the DHTT is a maximum number of bytes (e.g., 10,000,000 bytes) that can be accessed from the data object 108 before degraded handling is transitioned from moderately degraded handling to severely degraded handling.

If moderately degraded handling is being implemented in step 616, the storage server 107 keeps track of the cumulative number of bytes accessed thus far and upon determining that the cumulative number of bytes accessed exceeds the DHTT, the degraded handling in step 616 is transitioned from moderately degraded handling to severely degraded handling.

Moderately degraded handling may include throttling the I/O so that only a limited number of requests are handled per second, for example at most 20 requests per second, or so that only a limited number of bytes are transmitted per second, for example at most 200 kilobytes per second, or so that requests and bytes are both subject to limits. Operating with moderately degraded handling, a user is expected to be able to view file directory contents, or to view parts of manually selected data files. Such use may be expected to stay below the DHTT. A user attempting large-scale theft would not be able to steal large volumes of data quickly, but may succeed at theft if the process could be continued long enough. Persistent activity of that sort would be expected to cause the quota to be reached and exceeded, thus triggering a transition to severely degraded handling.

Severely degraded handling may include rejecting the I/O with an error response, or silently dropping the I/Os. Such degraded handling is expected to cause the user application either to fail or to hang without completing. If a legitimate user faces such failures, then the user will seek to resolve the problem. If a potential thief faces such failures, the potential thief may abandon the theft attempt.

Figure 6:
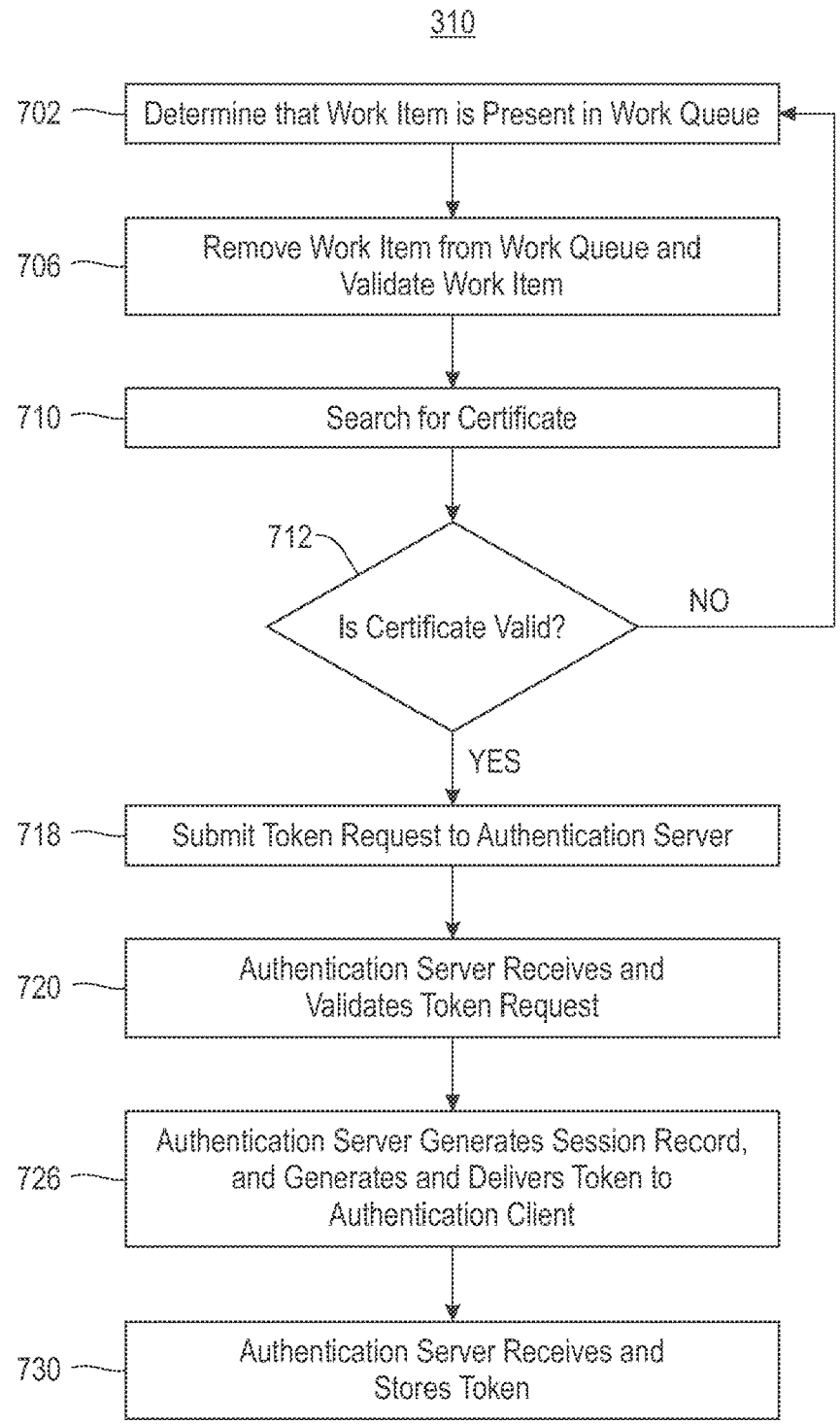
FIG. 6 is a flow chart describing in more detail a step of FIG. 1 for creating a token, in accordance with embodiments of the present invention.

FIG. 6 is a flow chart describing in more detail the step 310 of FIG. 1 for creating a token, in accordance with embodiments of the present invention.

In step 702, the authentication client 210 monitors the work queue 216 and determines that a work item is present in the work queue 216, wherein the work item is a request for creation of a token.

In step 706, the authentication client 210 removes the work item from the work queue 216 and then validates the work item by confirming that the process ID and executable file signature correspond to the current contents of the process signature table 220. If instead, the authentication client 210 determines that the work item is not valid, then the authentication client 210 discards the work item and returns to monitoring for another work item in step 702.

In step 710, after the authentication client 210 has validated the work item in step 706, the authentication client 210 searches for a certificate associated with the executable that matches the requested data object 108. If the authentication client 210 does not find a certificate, the authentication client 210 discards the work item and returns to monitoring for another work item in step 702, which is the expected outcome if the user is attempting to access a protected object using an access program that has not been authorized by the system administrator.

In step 712, after the authentication client 210 has found the certificate in step 710, the authentication client 210 determines whether the certificate is valid. The validation of the certificate comprises checking the self-consistency of the certificate's fields and determining whether the certificate has expired. If the authentication client 210 determines that the certificate is valid, then step 718 is next performed. If the authentication client 210 determines that the certificate is not valid, then execution control loops back to step 202 to monitor the work queue for another work item. Step 712 is described in more detail in FIG. 7.

In step 718, after the authentication client 210 has validated the certificate including having determined that the certificate has not expired, the authentication client 210 submits a token request, for creation of a token, to the authentication server 103. The token request contains the identifying fields in the certificate and a token request authentication field. The token request authentication field may comprise the certificate authentication code, or may comprise a nonce value and a nonce confirmation derived from the nonce and the certificate authentication code. The token request may contain additional identifiers.

In step 720, the authentication server receives the token request and validates the token request. Validating the token request comprises determining whether the token request authentication field corresponds to a valid certificate issued in the past for the identified data object 108. For example, the authentication server may contain a private key and the certificate authentication code may have been generated by encrypting the certificate identifiers using the private key. When the same identifiers are transmitted in the token request, the authentication server 103 may encrypt the same identifiers with the same private key to re-create the certificate authentication code to compare with the token request authentication field. If the token request fails validation, then the token request is rejected or ignored.

In step 726, after the token request has been validated in step 720, the authentication server 103 generates a session record 105 and generates and delivers (step 728) a corresponding token to the authentication client 210. The token contains a session identifier corresponding to the session record 105, and may contain some or all identifiers from the token request. The token and session record 105 may contain a list of code values for use in signed I/O requests. The token and session record 105 may each contain copies of a symmetric session key, or the token may contain a public session key and the session record may contain a private session key.

In step 730, the authentication client 210 receives and stores the token in the token table 212. If there is insufficient space in the token table 212, the authentication client 210 may remove and discard older tokens from the token table 212.

Figure 7:
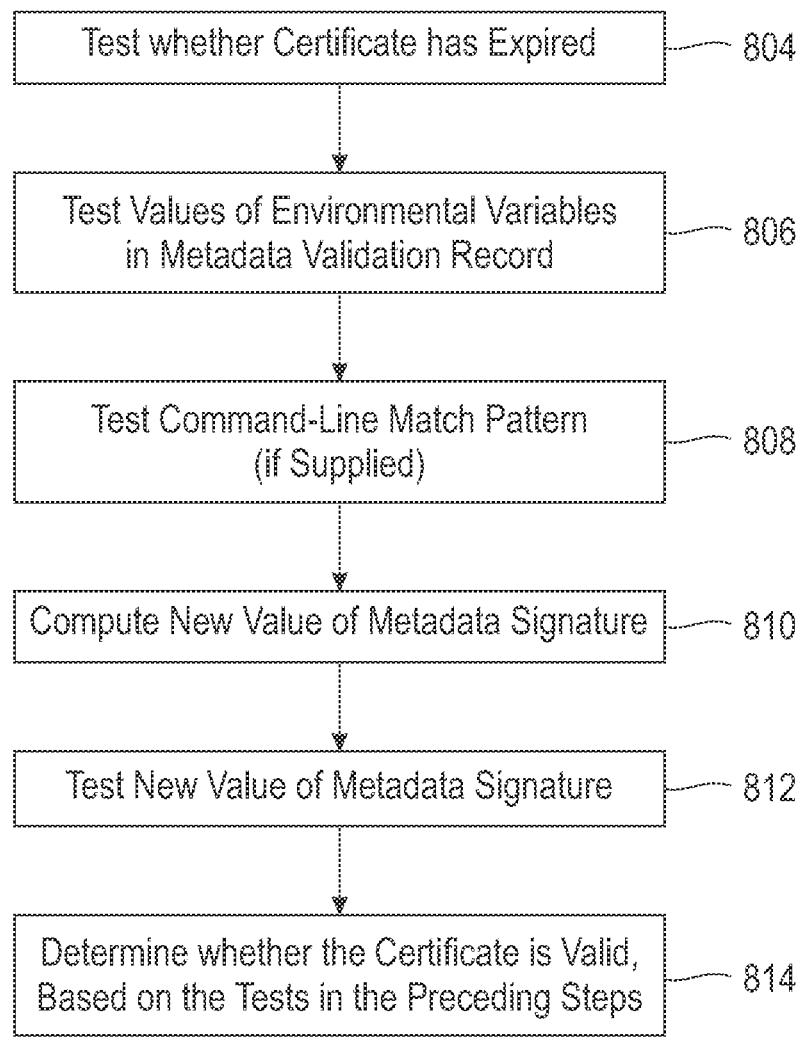
FIG. 7 is a flow chart describing in more detail a step of FIG. 6 for determining whether a certificate is valid, in accordance with embodiments of the present invention.

FIG. 7 is a flow chart describing in more detail the step 712 of FIG. 6 for determining whether the certificate is valid, in accordance with embodiments of the present invention.

Step 804 is a test in which the authentication client 210 checks whether the certificate has expired. The test passes if it is determined that the certificate has not expired; otherwise the test fails. If the authentication client 210 determines that the certificate has expired, then the authentication client 210 records the expiration in a log, removes the certificate from the certificate's active location, and discards the work item. If the authentication client 210 determines that the certificate has not expired, then the authentication client 210 validates the metadata signature in step 713 by: reading the metadata validation record, testing to determine that the state of the referenced process matches the metadata validation record, and testing the metadata signature.

Step 806 is a test in which the authentication client 210 checks whether the values of environment variables listed in the metadata validation record match the values of the environment variables in the process identified in the work item. The test passes if it is determined that the values of environment variables listed in the metadata validation record match the values of the environment variables in the process identified in the work item; otherwise the test fails.

If a command-line match pattern is supplied in the metadata validation record, then the authentication client 210, in step 808, tests to determine whether the command-line invocation of the executable of the access program 202 matches the recorded pattern. The test passes if it is determined that the command-line invocation of the executable of the access program 202 matches the recorded pattern; otherwise the test fails.

In step 810, the authentication client 210 computes a new value of the metadata signature from a concatenation of the metadata validation record with the current contents of all the directories listed in the metadata validation record.

Step 812 is a test in which the authentication client 210 checks whether the new value of the metadata signature matches the value of the metadata signature contained in the certificate. The test passes if it is determined that the metadata signature matches the value of the metadata signature contained in the certificate; otherwise the test fails.

Step 814 determines that (i) the certificate is valid if all of the preceding tests in steps 802, 804, 806, 808 and 812 pass; or (ii) the certificate is not valid if any one of the preceding tests in steps 804, 806, 808 and 812 fail.

In another embodiment, tokens and session records are not used. The I/O driver 206 determines if an applicable valid certificate is present. If an applicable valid certificate is not present, the I/O driver 206 submits a native I/O request. If an applicable valid certificate is present, the I/O driver 206 submits a signed I/O request in which the signature fields are computed from the certificate content and the content of the I/O request received by the I/O driver 206.

It is known to those of ordinary skill in the art how to compute cryptographically secure signature fields and validate the signature fields in ways that make it exceedingly unlikely that a party not in possession of a data object regarded as a shared secret would construct signature field values that would be successfully validated. Such methods may be used in implementing this invention, taking the certificate content or the token content to be the shared secret according to the embodiment. These methods of producing cryptographically secure signatures carry an overhead in computational effort and signature size. In some embodiments, efficiency is improved by using signature fields with lower overhead, which are not necessarily cryptographically secure.

Figure 8:
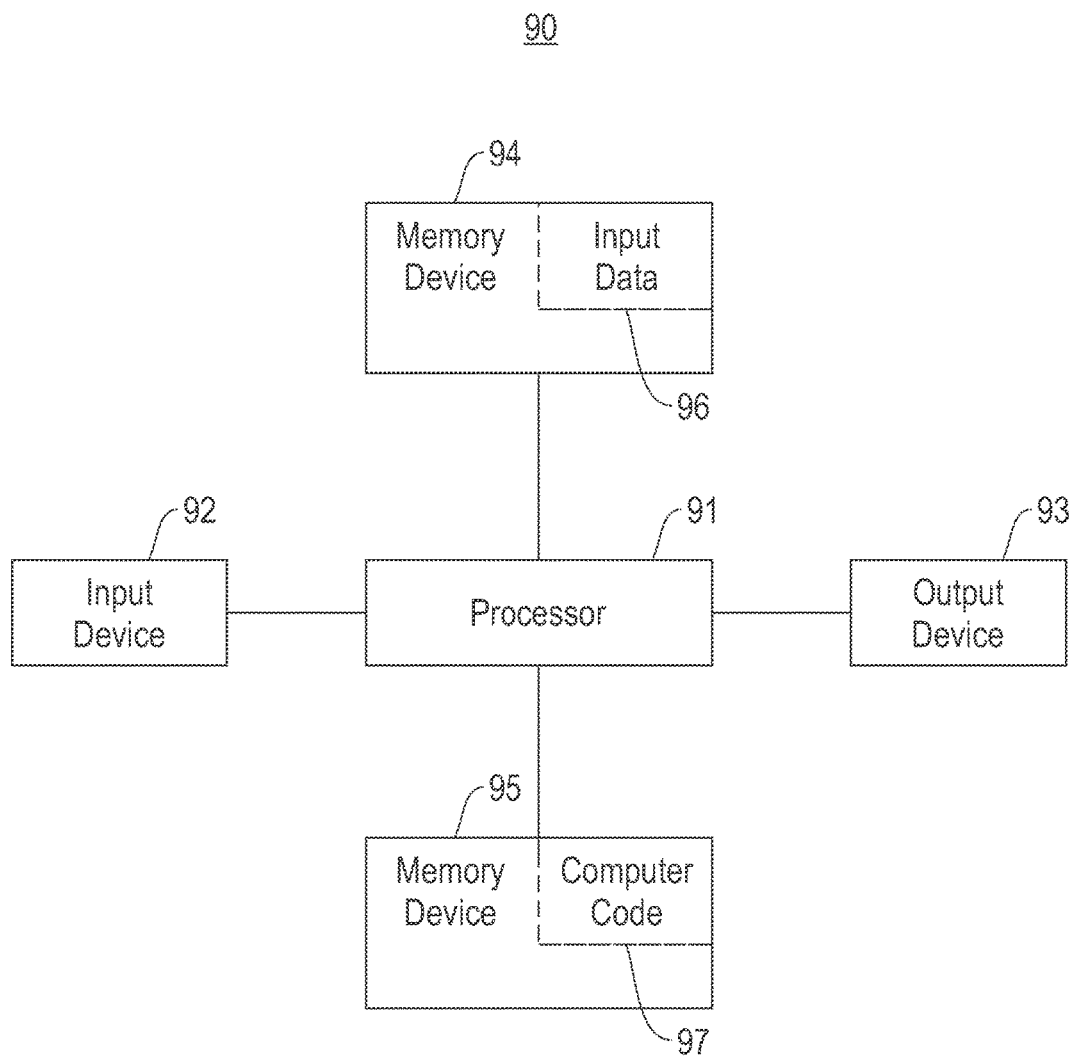
FIG. 8 illustrates a computer system used for regulating access by an access program to a data object residing in a storage system, in accordance with embodiments of the present invention.

FIG. 8 illustrates a computer system 90 used for regulating access by an access program to a data object residing in a storage system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement an algorithm for regulating access by an access program to a data object residing in a storage system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of performing a method for regulating access by an access program to a data object residing in a storage system.

In another embodiment, the invention provides a method that performs the process steps of the invention on a subscription, advertising, and/or fee basis. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for regulating access by an access program to a data object residing in a storage system, said method comprising:
    receiving, by a storage server from a client node, a certificate request for a certificate pertaining to access of the data object by the access program, said storage system comprising the storage server and the data object, said client node comprising the access program, said certificate request comprising a signature of the access program, a signature of metadata of the access program, and an identifier of the data object, said signature of the access program and said signature of metadata of the access program being separate and distinct signatures;
    said storage server validating the certificate request and in response, said storage server generating the certificate and transmitting the certificate to the client node, said certificate comprising the signature of the access program, the signature of the metadata of the access program, the identifier of the data object, and a certificate authentication code for validating the certificate;
    after said transmitting the certificate and prior to receiving an input/output (I/O) request for access of the data object by the access program, said storage server receiving from the client node a token request for a token whose existence is required for the client node to generate the I/O request as a signed I/O request;
    in response to said receiving the token request, said storage server generating the token and transmitting the token to the client node;
    after said transmitting the token, said storage server receiving from the client node the I/O request; and
    said storage server determining that the I/O request is valid and in response, processing the I/O request, wherein said determining that the I/O request is valid comprises determining that the I/O request is signed using the certificate.

2. A computer program product, comprising one or more computer readable hardware storage devices having computer readable program code stored therein, said program code containing instructions executable by the one or more processors to implement a method for regulating access by an access program to a data object residing in a storage system, said method comprising:
    receiving, by a storage server from a client node, a certificate request for a certificate pertaining to access of the data object by the access program, said storage system comprising the storage server and the data object, said client node comprising the access program, said certificate request comprising a signature of the access program, a signature of metadata of the access program, and an identifier of the data object, said signature of the access program and said signature of metadata of the access program being separate and distinct signatures;
    said storage server validating the certificate request and in response, said storage server generating the certificate and transmitting the certificate to the client node, said certificate comprising the signature of the access program, the signature of the metadata of the access program, the identifier of the data object, and a certificate authentication code for validating the certificate;
    after said transmitting the certificate and prior to receiving an input/output (I/O) request for access of the data object by the access program, said storage server receiving from the client node a token request for a token whose existence is required for the client node to generate the I/O request as a signed I/O request;
    in response to said receiving the token request, said storage server generating the token and transmitting the token to the client node;
    after said transmitting the token, said storage server receiving from the client node the I/O request; and
    said storage server determining that the I/O request is valid and in response, processing the I/O request, wherein said determining that the I/O request is valid comprises determining that the I/O request is signed using the certificate.

3. A computer system, comprising one or more processors, one or more memories coupled to the one or more processors, and one or more computer readable storage devices coupled to the one or more processors, said one or more storage devices containing program code executable by the one or more processors via one or more memories to implement a method for regulating access by an access program to a data object residing in a storage system, said method comprising:
    receiving, by a storage server from a client node, a certificate request for a certificate pertaining to access of the data object by the access program, said storage system comprising the storage server and the data object, said client node comprising the access program, said certificate request comprising a signature of the access program, a signature of metadata of the access program, and an identifier of the data object, said signature of the access program and said signature of metadata of the access program being separate and distinct signatures;
    said storage server validating the certificate request and in response, said storage server generating the certificate and transmitting the certificate to the client node, said certificate comprising the signature of the access program, the signature of the metadata of the access program, the identifier of the data object, and a certificate authentication code for validating the certificate;
    after said transmitting the certificate and prior to receiving an input/output (I/O) request for access of the data object by the access program, said storage server receiving from the client node a token request for a token whose existence is required for the client node to generate the I/O request as a signed I/O request;

in response to said receiving the token request, said storage server generating the token and transmitting the token to the client node;

after said transmitting the token, said storage server receiving from the client node the I/O request; and said storage server determining that the I/O request is valid and in response, processing the I/O request, wherein said determining that the I/O request is valid comprises determining that the I/O request is signed using the certificate.

4. The method of claim 1, wherein said processing the I/O request comprises processing the I/O request with privileged handling.

5. The computer program product of claim 2, wherein said processing the I/O request comprises processing the I/O request with privileged handling.

6. The computer system of claim 3, wherein said processing the I/O request comprises processing the I/O request with privileged handling.

7. The method of claim 1, wherein the access program is encoded in binary, and wherein the signature of the access program is a number computed from the encoded binary of the access program.

8. The computer program product of claim 2, wherein the access program is encoded in binary, and wherein the signature of the access program is a number computed from the encoded binary of the access program.

9. Computer system of claim 3, wherein the access program is encoded in binary, and wherein the signature of the access program is a number computed from the encoded binary of the access program.

10. The method of claim 1, wherein the signature of the metadata of the access program is determined from a concatenation of a metadata validation record with the current content of all directories listed in the metadata validation record.

11. The computer program product of claim 2, wherein the signature of the metadata of the access program is determined from a concatenation of a metadata validation record with the current content of all directories listed in the metadata validation record.

12. The computer system of claim 3, wherein the signature of the metadata of the access program is determined from a concatenation of a metadata validation record with the current content of all directories listed in the metadata validation record.

* * * * *